United States Patent [19]
Gustin

[11] Patent Number: 4,828,091
[45] Date of Patent: May 9, 1989

[54] ELECTROMAGNETICALLY ACTUATED FRICTION DISC CLUTCH

[75] Inventor: David C. Gustin, Loves Park, Ill.

[73] Assignee: Dana Corporation, Toledo, Ohio

[21] Appl. No.: 152,820

[22] Filed: Feb. 5, 1988

[51] Int. Cl.$^4$ .................. F16D 13/52; F16D 27/10
[52] U.S. Cl. ........................... 192/84 C; 192/70.2
[58] Field of Search ............. 192/84 C, 84 B, 84 A, 192/70.2; 188/163

[56] References Cited

U.S. PATENT DOCUMENTS

| | | | |
|---|---|---|---|
| 2,956,657 | 10/1960 | Rudisch | 192/84 C |
| 4,175,650 | 11/1979 | Miller | 192/84 C |

FOREIGN PATENT DOCUMENTS

| | | | |
|---|---|---|---|
| 1272090 | 8/1961 | France | 192/84 C |
| 1326822 | 4/1963 | France | 192/84 C |

*Primary Examiner*—Rodney H. Bonck
*Attorney, Agent, or Firm*—Leydig, Voit & Mayer

[57] ABSTRACT

An armature is attracted to an electromagnetic field and moves axially of a rotary shaft when the field is excited. As the armature moves toward the field, it causes a movable pressure plate to shift along the shaft toward a fixed pressure plate and to press the discs of a disc pack into frictional engagement with one another. The disc pack is located between the two pressure plates and, when the discs are pressed into frictional engagement, they transmit torque from the shaft to an output member. The movable pressure plate is splined to the shaft and is tied rigidly to the armature to prevent the armature from cocking relative to the shaft.

8 Claims, 3 Drawing Sheets

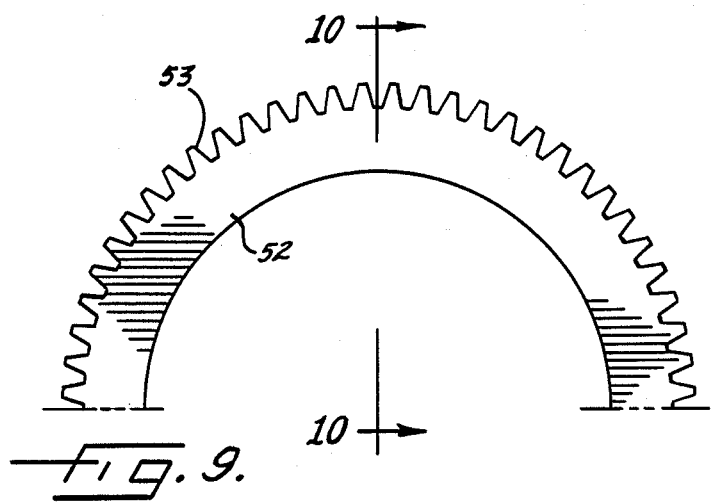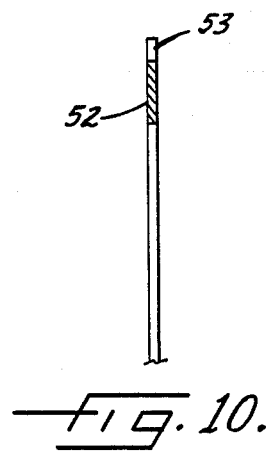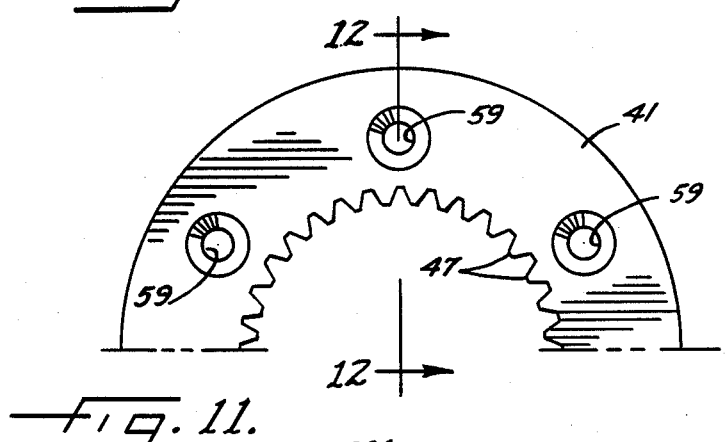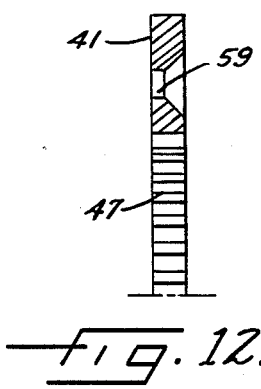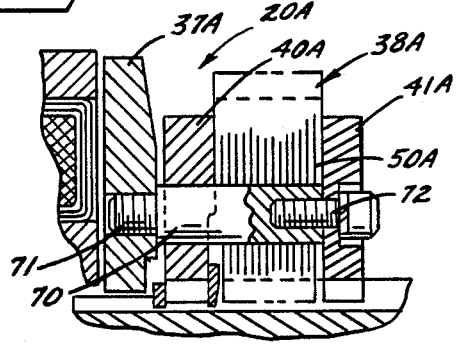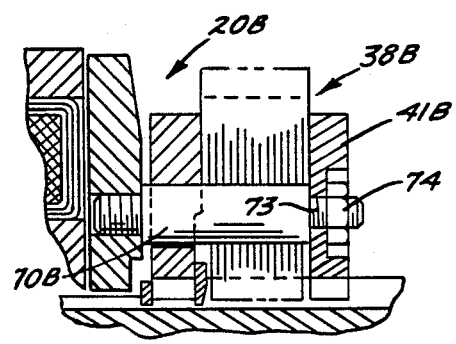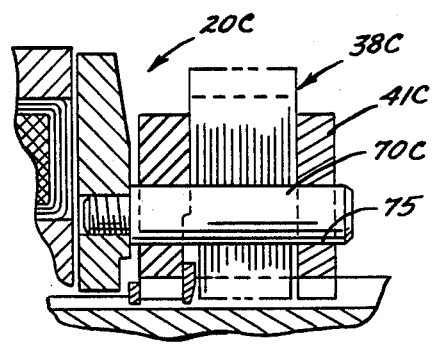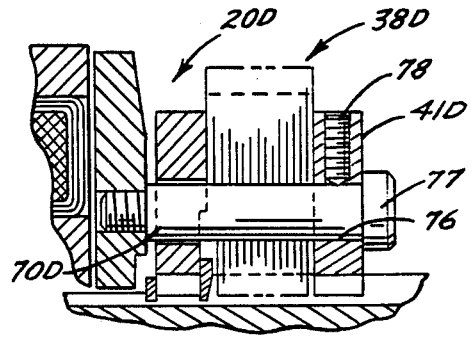

ELECTROMAGNETICALLY ACTUATED FRICTION DISC CLUTCH

BACKGROUND OF THE INVENTION

This invention relates to an electromagnetically actuated clutch which is selectively operable to couple and uncouple a rotary shaft and a rotary output member. More specifically, the invention relates to a clutch of the type in which a rotatable armature is coaxial with the shaft and is drawn axially toward the shell of an electromagnetic field by magnetic flux when the field is excited. To draw the armature toward the field, the flux cuts across a narrow air gap between the field shell and the armature.

When the armature is drawn toward the field shell, the armature pulls on an axially movable pressure plate and causes the plate to press the discs of a disc pack into frictional engagement with one another and with an axially fixed pressure plate. Such frictional engagement causes the output member to rotate in unison with the input shaft.

SUMMARY OF THE INVENTION

The general aim of the present invention is to provide a new and improved clutch of the foregoing type in which the armature is prevented from cocking relative to the shaft and is held in a precisely square position relative to the shaft so as to keep the air gap between the armature and the field shell of a uniform width around the entire circumference of the armature. This is achieved by splining the movable pressure plate directly on the shaft and by tying the movable pressure plate rigidly to the armature so that the pressure plate can coact with the shaft to hold the armature square to the shaft.

BRIEF DESCRIPTION OF THE DRAWINGS

FIG. 9 is a reduced fragmentary cross-section taken substantially along the line 9—9 of FIG. 2.

FIG. 10 is a fragmentary cross-section taken along the line 10—10 of FIG. 9.

FIG. 11 is a reduced fragmentary cross-section taken substantially along the line 11—11 of FIG. 2.

FIG. 12 is a cross-section taken along the line 12—12 of FIG. 11.

FIGS. 13, 14, 15 and 16 are views generally similar to FIG. 2 but on a reduced scale and showing four additional embodiments of a clutch incorporating the features of the present invention.

DETAILED DESCRIPTION OF THE PREFERRED EMBODIMENTS

Figure 1:
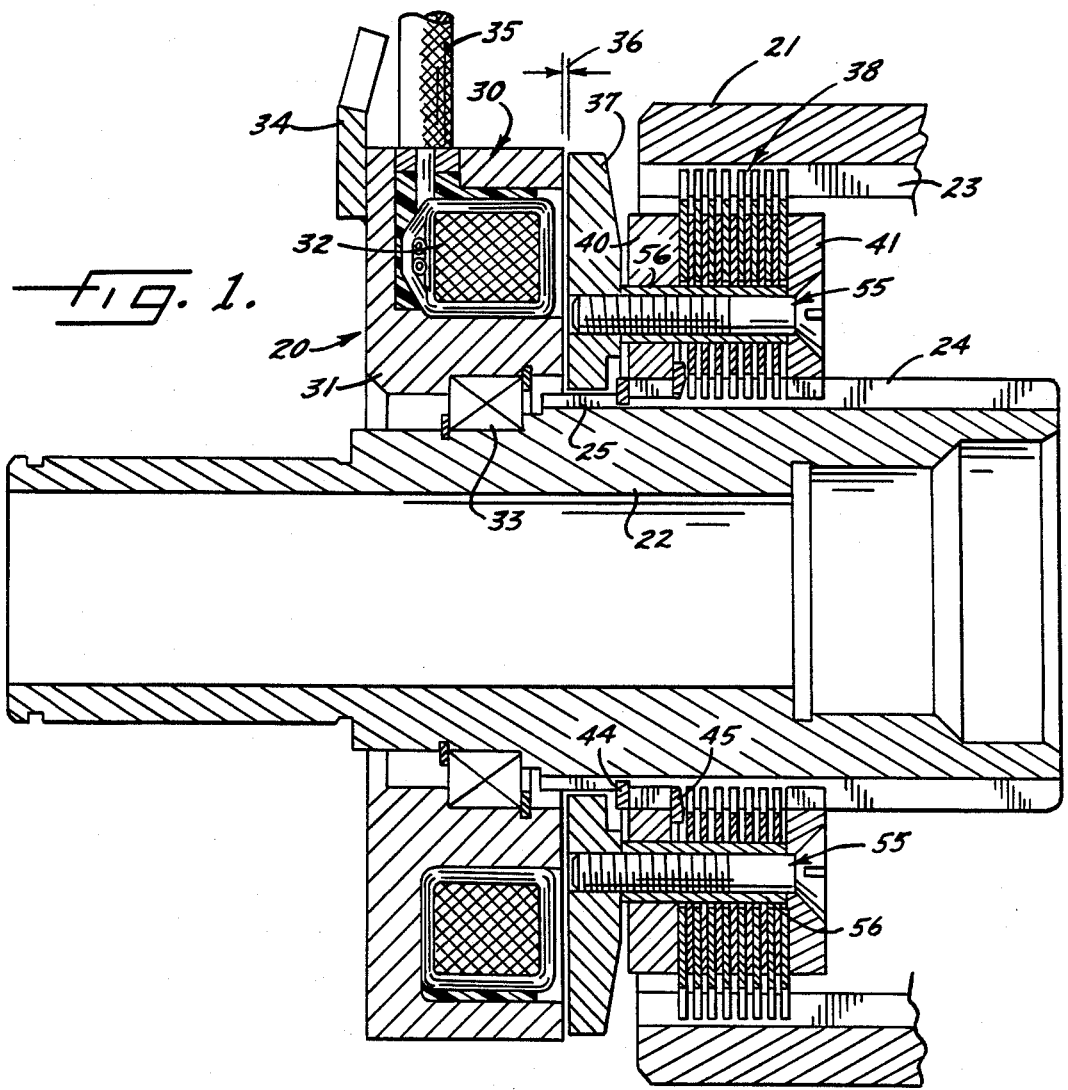
FIG. 1 a cross-sectional view taken axially through one embodiment of a new and improved clutch incorporating the unique features of the present invention.

For purposes of illustration, the invention has been shown in the drawings as being embodied in an electromagnetically actuated clutch 20 for coupling an output member 21 for rotation with an input member 22 and for selectively uncoupling the output member from the input member. In this instance, the output member 21 is in the form of a cylindrical sleeve whose inner wall is formed with angularly spaced and axially extending ribs or splines 23. The input member 22 is a stepped-diameter shaft having angularly spaced and axially extending ribs or splines 24 formed on the outer periphery of the shaft portion of largest diameter. Axially extending and angularly spaced splines 25 of reduced diameter are formed on the shaft 22 at the ends of the splines 24 and are located about midway along the length of the shaft.

The clutch 20 includes a rotationally stationary electromagnetic field 30 formed by a shell 31 and by an annular coil 32 located within the shell. A double row, angular contact ball bearing 33 is fixed within the shell and supports the shaft 22 to rotate relative to the shell. Turning of the shell is prevented by an anti-rotation tab 34 on the shell and adapted to be anchored to a fixed frame member (not shown).

An electrical lead 35 extends radially into the shell 31 and is connected to the coil 32. When the lead is connected to a d.c. voltage source, the coil is excited and produces magnetic flux for engaging the clutch 20. The flux cuts across an air gap 36 and magnetically attracts an armature 37 toward the shell 31. As an incident thereto, a disc pack 38 acts to couple the output sleeve 21 for rotation in unison with the input shaft 22.

In accordance with the present invention, the armature 37 and the disc pack 38 are connected together and are mounted on the input shaft 22 in a unique manner preventing the armature from cocking on the shaft. As a result, the axial width of the air gap 36 between the shell and the armature remains uniform around the periphery of the armature so as to promote consistent operation of the clutch 20.

Figure 3:
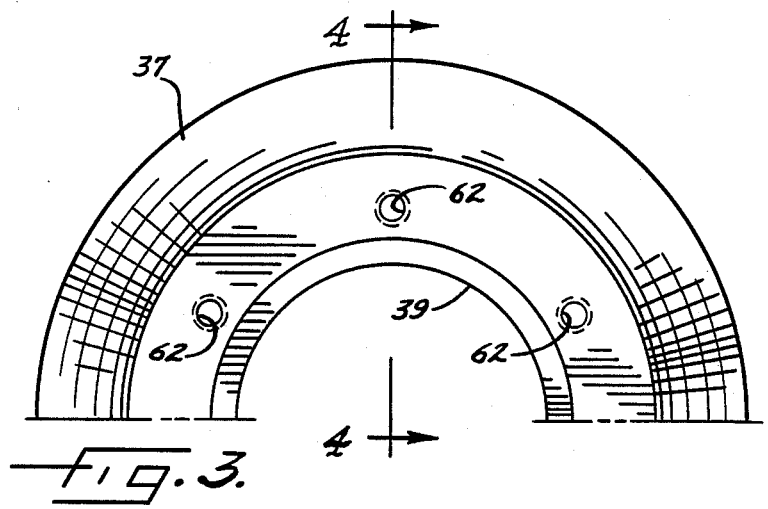
FIG. 3 is a reduced fragmentary cross-section taken substantially along the line 3—3 of FIG. 2.
Figure 4:
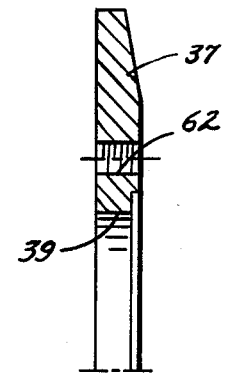
FIG. 4 is a fragmentary cross-section taken along the line 4—4 of FIG. 3.

The armature 37 is shown in detail in FIGS. 3 and 4 and comprises a ring-like member formed with a smooth inner bore 39. The armature encircles the splines 25 of the shaft 22 with rather close radial clearance of approximately 0.003".

Figure 2:
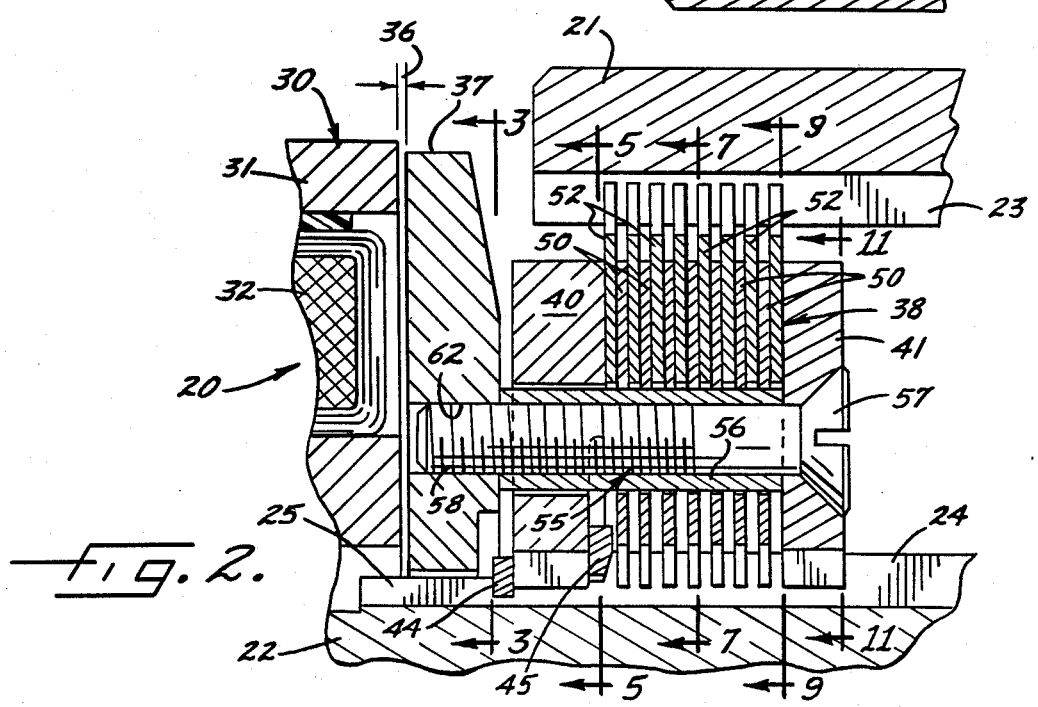
FIG. 2 enlarged view of certain parts shown in FIG. 1.
Figure 5:
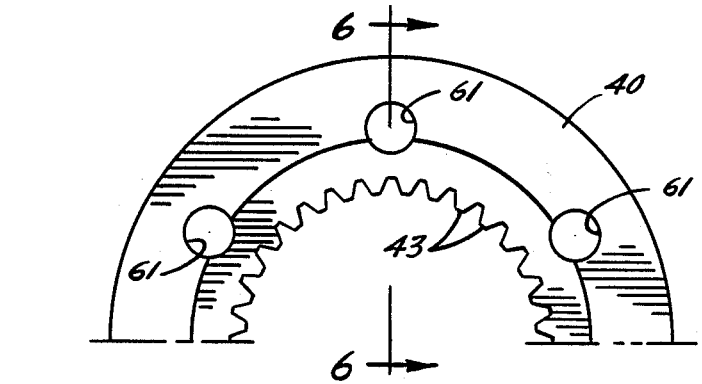
FIG. 5 is a reduced fragmentary cross-section substantially along the line 5—5 of FIG. 2.
Figure 6:
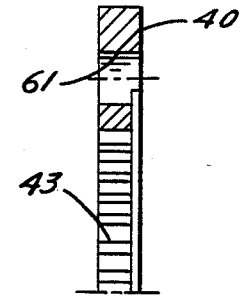
FIG. 6 is a fragmentary cross-section taken along the line 6—6 of FIG. 5.

The disc pack 38 comprises two axially spaced pressure plates 40 and 41. The pressure plate 40 is located between the armature 37 and the pressure plate 41 and is disposed in face-to-face relation with the armature. As shown in FIGS. 5 and 6, the pressure plate 40 is a ring-like member having an inner bore formed with angularly spaced splines or teeth 43 which mate with the splines 24 on the shaft 22 to cause the pressure plate to rotate with the shaft. Snap rings 44 and 45 (FIG. 2) are located on opposite sides of the pressure plate 40 and fit within circumferentially extending grooves in the shaft 22 so as to hold the pressure plate 40 in an axially fixed position along the shaft. The snap ring 44 is a straight ring while the inner periphery of the snap ring 45 is beveled (see FIG. 2) and fits in a beveled groove to take up axial clearance at the pressure plate 40.

As shown in FIGS. 11 and 12, the pressure plate 41 is substantially the same as the pressure plate 40. The pressure plate 41 is permitted to slide back and forth along the shaft 22 and its inner bore is formed with angularly spaced splines or teeth 47 which mate with the splines 24 of the shaft to enable such sliding while transmitting torque from the shaft to the pressure plate.

Figure 7:
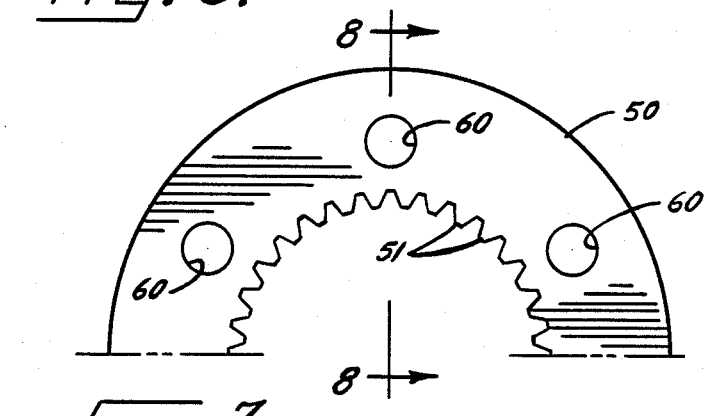
FIG. 7 is a reduced fragmentary cross-section taken substantially along the line 7—7 of FIG. 2.
Figure 8:
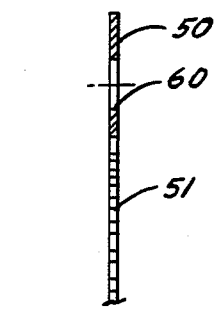
FIG. 8 is a fragmentary cross-section taken along the line 8—8 of FIG. 7.

Several axially spaced friction discs 50 are located between the pressure plates 40 and 41 and form part of the disc pack 38. Herein, there are seven such discs and the inner bore of each is formed with angularly spaced splines or teeth 51 (FIGS. 7 and 8) which mate with the splines 24 of the shaft 22. The discs rotate in unison with the shaft and are capable of shifting axially along the shaft. The outer peripheries of the discs are spaced well inwardly of the inner periphery of the output sleeve 21.

Additional friction discs 52 are interleaved with the friction discs 50 and also are located adjacent the opposing inboard faces of the pressure plates 40 and 41, there being eight discs 52 in the present clutch 20. As shown in FIGS. 9 and 10, each of the discs 52 is in the form of a ring of relatively narrow radial width and having angularly spaced splines or teeth 53 around its outer periphery. The teeth 53 mate with the splines 23 on the inner wall of the output sleeve 22.

The disc pack 38 is completed by six angularly spaced screws 55 (FIG. 2) and by six tubular bushings 56. Each screw 55 includes a fructoconical head 57 and a threaded shank 58. The heads 57 of the screws are seated within countersunk holes 59 (FIGS. 11 and 12) in the pressure plate 41. The shank 58 of the screws extend through the holes 59, extend through smooth holes 60 (FIG. 7) in the discs 50 and smooth holes 61 (FIG. 5) in the pressure plate 40, and are threaded into tapped holes 62 (FIG. 3) in the armature 37. The bushings 56 are telescoped over the shanks of the screws and are located in the holes 60 and 61. One end of each bushing 56 engages the inboard face of the pressure plate 41 while the other end of each bushing engages the opposing face of the armature 37. The bushings maintain a fixed axial spacing between the armature 37 and the pressure plate 41.

When the coil 32 is excited, the magnetic flux crosses the air gap 36 and attracts the armature 37 axially toward the shell 31 but not so far as to cause the armature to contact the shell. As the armature moves toward the shell, it acts through the screws 55 and causes the heads 57 of the screws to pull the pressure plate 41 axially toward the fixed pressure plate 40. As a result, the discs 52 are clamped frictionally against the discs 50 and, in addition, the two outboard discs 50 are clamped frictionally against the pressure plates 40 and 41. Since the pressure plates 40 and 41 and the discs 50 are splined to and rotate with the shaft 22, such frictional clamping causes the discs 52 to rotate with the pressure plates 40 and 41 and the discs 50 and to transmit torque to the input sleeve 21 by way of the teeth 53 on the discs 52 and the splines 23 in the sleeve 24. Thus, the output sleeve 21 is coupled to and is caused to rotate as a unit with the input shaft 22.

When the coil 32 is de-energized, the discs 50 and 52 tend to spring apart and move out of frictional engagement with one another so as to uncouple the sleeve 21 from the shaft 22. The discs push the pressure plate 41 from left-to-right and the pressure plate acts through the screws to pull the armature 37 away from the field shell 31.

Because the pressure plate 41 is splined to the shaft 22 and is tied rigidly to the armature 37 by the screws 55, the pressure plate prevents the armature from cocking on the shaft and thereby keeps the air gap 36 of constant width around the entire circumference of the armature. Because the armature is piloted on the angularly spaced splines 25, there is relatively little flux leakage through the shaft.

Another embodiment of a clutch 20A incorporating the features of the invention is shown in FIG. 13. In this instance, the screws 55 and the bushings 56 are replaced by angularly spaced studs 70 which extend through holes in the pressure plate 40A and in the discs 50A of the disc pack 38A. The ends of each stud abut the opposing faces of the armature 37A and the pressure plate 41A to maintain a fixed axial spacing between the two. Formed on one end of each stud is a reduced diameter threaded shank 71 which is screwed into the tapped hole in the armature 37A. Each stud is secured tightly to the pressure plate 40A by a cap screws 72 having a head bearing against the pressure plate and having a shank extending through the pressure plate and threaded into a tapped hole in the stud 70.

The clutch 20B shown in FIG. 14 is similar to the clutch 20A except that each stud 70B is formed with an elongated threaded shank 73 which extends through a hole in the pressure plate 41B. A nut 74 is threaded onto the shank 73 of each stud 70B and clamps the pressure plate 41B against the end of the stud.

In the clutch 20C shown in FIG. 15, the stud 70C extends through a hole 75 in the pressure plate 41C with a tight press fit. In the clutch 20D shown in FIG. 16, the stud 70D extends through a hole 76 in the pressure plate 41D with a snug fit and is formed with a head 77 which engages the pressure plate 41D. A set screw 78 extends radially through the pressure plate 41D and is tightened against the stud 70D to prevent the pressure plate from moving axially relative to the stud.

I claim:

1. An electromagnetically actuated clutch for selectively coupling a rotatable sleeve to a rotatable shaft, said shaft and the inner diameter of said sleeve being formed with axially extending and angularly spaced splines, said clutch comprising an electromagnetic field, means supporting said shaft for rotation relative to said field, an armature coaxial with and movable axially of said shaft and toward and away from said field, said armature being magnetically attracted toward said field when said field is excited, first and second pressure plates spaced axially from one another along said shaft and each formed with a central hole having angularly spaced teeth mating with the splines of said shaft so as to couple said pressure plates for rotation with said shaft, first and second groups of discs located within the space between said pressure plates, the discs of said first group being spaced axially from one another and being formed with holes having angularly spaced teeth mating with the splines of said shaft so as to couple the discs of the first group for rotation with said shaft, the discs of said second group being interleaved with the discs of said first group and having outer peripheries formed with angularly spaced teeth mating with the splines of said sleeve so as to couple said sleeve for rotation with the discs of said second group, said first pressure plate being located between said armature and said second pressure plate and being held against axial movement along said shaft so as to restrict axial movement of said discs toward said armature, and means connecting said second pressure plate rigidly to said armature for back and forth movement with said armature while maintaining a fixed axial spacing between said second pressure plate and said armature whereby said second pressure plate forces said discs into frictional engagement with one another to cause said sleeve to rotate with said shaft when said armature is attracted toward said field, said second pressure plate coacting with said shaft to hold said armature in a plane extending perpendicular to the axis of the shaft.

2. An electromagnetically actuated clutch as defined in claim 1 in which said means comprise angularly spaced and axially extending screws having shanks threaded into said armature and having heads engaging said second pressure plate, and bushings telescoped over said screws and having ends abutting the opposing faces of said armature and said second pressure plate.

3. An electromagnetically actuated clutch as defined in claim 1 in which said means comprise angularly spaced and axially extending studs having shanks threaded into said armature and having ends abutting the opposing faces of said armature and said second pressure plate, and means for clamping said studs to said second pressure plate.

4. An electromagnetically actuated clutch as defined in claim 3 in which said clamping means comprise angularly spaced screws extending axially through said second pressure plate and threaded into said studs, said screws having heads engaging said second pressure plate.

5. An electromagnetically actuated clutch as defined in claim 3 in which said clamping means comprise threaded portions formed integrally with said studs and extending axially through said second pressure plate, and nuts on said threaded portions and engaging said second pressure plate.

6. An electromagnetically actuated clutch as defined in claim 1 in which said means comprise angularly spaced and axially extending studs each having reduced diameter shanks threaded into said armature, the end of each stud adjacent the shank thereof engaging said armature, and the opposite end portion of each stud being received within said second pressure plate with a press fit.

7. An electromagnetically actuated clutch as defined in claim 1 in which said means comprise angularly spaced and axially extending studs each having reduced diameter shanks threaded into said armature, the end of each stud adjacent the shank thereof engaging said armature, and a set screw holding said stud against axial movement relative to said second pressure plate.

8. An electromagnetically actuated clutch for selectively coupling a rotatable sleeve to a rotatable shaft, said shaft and the inner diameter of said sleeve being formed with axially extending and angularly spaced splines, said clutch comprising an electromagnetic field, means supporting said shaft for rotation relative to said field, an armature coaxial with and movable axially of said shaft and toward and away from said field, said armature being magnetically attracted toward said field when said field is excited, first and second pressure plates spaced axially from one another along said shaft and each formed with a central hole having angularly spaced teeth mating with the splines of said shaft so as to couple said pressure plates for rotation with said shaft, first and second groups of discs located within the space between said pressure plates, the discs of said first group being spaced axially from one another and being formed with holes having angularly spaced teeth mating with the splines of said shaft so as to couple the discs of the first group for rotation with said shaft, the discs of said second group being interleaved with the discs of said first group and having outer peripheries formed with angularly spaced teeth mating with the splines of said sleeve so as to couple said sleeve for rotation with the discs of said second group, said first pressure plate being located between said armature and said second pressure plate and being held against axial movement along said shaft so as to restrict axial movement of said discs toward said armature, and means connecting said second pressure plate rigidly to said armature for back and forth movement with said armature while maintaining a fixed axial spacing between said second pressure plate and said armature whereby said second pressure plate forces said discs into frictional engagement with one another to cause said sleeve to rotate with said shaft when said armature is attracted toward said field, said means comprising angularly spaced screws extending through said pressure plates and the discs of both groups, said screws having shanks threaded into said armature and having heads abutting the outboard face of said second pressure plate, and bushings telescoped over said screws and having ends abutting the opposing inboard faces of said armature and said second pressure plate, said second pressure plate coacting with said shaft, said screws and said bushings to hold said armature in a plane extending perpendicular to the axis of said shaft.

* * * * *